US006456333B1

(12) United States Patent
Masuya et al.

(10) Patent No.: US 6,456,333 B1
(45) Date of Patent: Sep. 24, 2002

(54) TELEVISION SYSTEM DISCRIMINATOR AND TELEVISION SYSTEM DISCRIMINATION METHOD

(75) Inventors: Yuzuru Masuya; Tatsuo Yamauchi, both of Tokyo (JP)

(73) Assignee: Oki Electric Industry Co, Ltd., Tokyo (JP)

( * ) Notice: Subject to any disclaimer, the term of this patent is extended or adjusted under 35 U.S.C. 154(b) by 0 days.

(21) Appl. No.: 09/324,771

(22) Filed: Jun. 3, 1999

(30) Foreign Application Priority Data

Jul. 22, 1998 (JP) .......................................... 10-206145

(51) Int. Cl.[7] ................................................ H04N 5/46
(52) U.S. Cl. ...................................... 348/558; 348/555
(58) Field of Search ................................ 348/558, 554, 348/555, 556, 557, 449; H04N 5/46

(56) References Cited

U.S. PATENT DOCUMENTS 4,933,749 A * 6/1990 Van Lammeren et al. .. 348/558
5,784,117 A * 7/1998 Mitarai et al. .............. 348/558
5,872,601 A * 2/1999 Seitz .......................... 348/558

* cited by examiner

Primary Examiner—Michael H. Lee
(74) Attorney, Agent, or Firm—Rabin & Berdo, P.C.

(57) ABSTRACT

The object of the present invention is to provide a TV system discriminator capable of being applied to when the inputted TV signal is an analog signal or a digital signal, and capable of accurately discriminating between TV systems with small differences in line number and field number.

In order to achieve the above object, the TV system discriminator of the present invention comprises a separator for extracting a synchronized signal for a TV signal inputted in accordance with one of a plurality of TV systems, a phase difference sensor for sensing a phase difference of this separated synchronized signal and a prescribed reference signal, and a phase difference displacement discriminator for discriminating a TV system corresponding to an inputted TV signal based on the direction of temporal displacement of this phase difference.

8 Claims, 5 Drawing Sheets

TV system discriminator 10

TELEVISION SYSTEM DISCRIMINATOR AND TELEVISION SYSTEM DISCRIMINATION METHOD

BACKGROUND OF THE INVENTION

1. Field of the Invention

The present invention relates to a TV system discriminator for automatically discriminating a TV (television) system corresponding to an inputted TV signal. This circuit employs, for example, a television signal converter.

2. Description of Related Art

As shown in a block diagram of FIG. 1, a typical TV system converter 1 is equipped with a TV system discriminator 2 for automatically discriminating a TV system (for example, the NTSC system or the PAL system) corresponding to a TV signal inputted at an input stage.

When the television system discriminated by the TV system discriminator 2 coincides with the television system according to a signal to be outputted from the TV system converter 1 the TV system converter 1, does not change the designation of television system. When the discriminated television system differs from the television system to be outputted from the TV system converter 1, the TV system converter 1 changes over to the television system for the inputted television signal.

Generally, the TV system converter 1 will have a function for converting between two types of television system and the TV system discriminator 2 discriminates as to which of the two types of TV system the inputted TV signal corresponds.

FIG. 2 is a block view showing a related TV system discriminator 2. The TV system discriminator 2 senses whether or not a television signal of a specific television system is inputted. An indication is also given when the TV signal inputted to the TV system discriminator 2 does not correspond to these specific television systems, i.e. when the inputted television signal corresponds to a still further television system different from the two types of television-system.

In FIG. 2, a television input signal 21 such as, for example, a composite television signal or a luminance signal after Y/C separation is inputted to a sync separator 22. A composite synchronized signal is then separated from the television input signal 21 by the sync separator 22 and inputted to the H/V separator 23.

This H/V separator 23 separates a horizontal sync signal (hereinafter referred to as "H-sync") and a vertical sync signal (hereinafter referred to as "V-sync") from the inputted synchronized signal. Here, H-sync is supplied to a field counter 24 and V-sync is supplied to a decoder 25.

The field counter 24 counts the number of V-sync signals that arrive after reset.

The decoder 25 senses the time when the count value of the field counter 24 becomes a line number for one field corresponding to the prescribed TV system. The decoder 25 then detects whether or not this timing is within one horizontal scanning period (gate period) from the timing of V-sync supplied from the H/V separator 23. The decoder 25 then resets the field counter 24 after one horizontal scanning period from the V-sync timing provided by the H/V separator 23.

When the decoder 25 detects that a signal "falls within a gate period", the TV input signal is determined to correspond to a prescribed TV system and a sense signal is outputted to the hysteresis circuit 26.

In order to prevent erroneous determinations, the hysteresis circuit 26 finally forms a discrimination signal 27 when the sense signal from the decoder 25 is consecutively inputted prescribed number of times.

As becomes clear from the above description, the TV system discriminator 2 shown in FIG. 2 determines the television system based on the number of lines per one field being different in each television system.

However, there is the fear that it will be difficult for the aforementioned television system discrimination circuit to make discriminations or that the precision of such discriminations will be extremely low when the difference between the line number and field number is small as between two types of TV systems taken as objects of discrimination.

For example, two types of television system exist for TV signals (hereinafter taken as HDTV signals) used in "High Definition Television" (usually referred to as "Hi-Vision") where the line number/number of fields per second (field fiequency) are 1125 lines/60 Hz and 1125/59.94 Hz, respectively. In both cases the difference in the number of fields per second is extremely small and discrimination is therefore difficult using the TV system discriminator 2 shown in FIG. 2.

With regards to discrimination between these two types of HDTV signals, a method of discriminating the difference of the sampling frequencies at the time of putting the HDTV signals into digital form based on phase-synchronized locking and unlocking occurring at a horizontal sync signal-referenced PLL circuit has been put forward.

However, this discrimination method employing this PLL circuit cannot be applied to cases where the TV input signal is already in the form of a digital signal.

It is therefore wished to obtain a TV system discriminator that can be applied when a TV input signal is an analog signal or digital signal and that is capable of accurately discriminating between television systems where the difference between the line number and the field number is small.

SUMMARY OF THE INVENTION

It is therefore the object of the present invention to provide a television system discriminator that can be applied when a TV input signal is an analog signal or a digital signal and that is capable of accurately discriminating between television systems where the difference between the line number and the field number is small.

In order to achieve the above object, the TV system discriminator of the present invention comprises a separator for extracting a synchronized signal for a TV signal inputted in accordance with one of a plurality of TV systems, a phase difference sensor for sensing a phase difference of this separated synchronized signal and a prescribed reference signal, and a phase difference displacement discriminator for discriminating a TV system corresponding to an inputted TV signal based on the direction of temporal displacement of this phase difference.

DETAIL DESCRIPTION OF THE PREFERRED EMBODIMENTS

The following is a description of an embodiment of a TV system discriminator to which this invention is applied.

The TV system discriminator shown in this specific embodiment is capable of discriminating between television systems of difference field numbers per unit time (field frequency).

Figure 1:
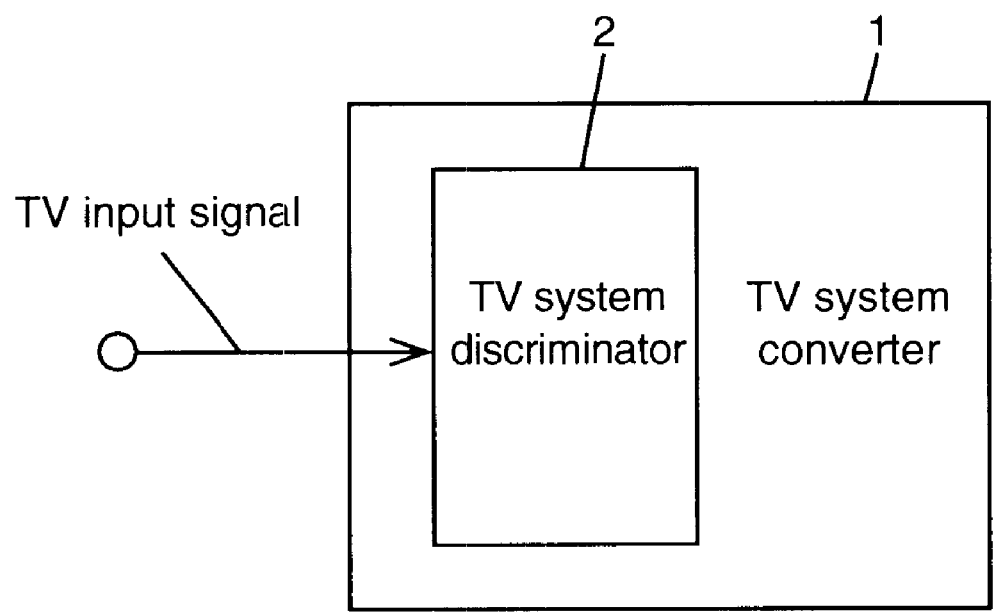
FIG. 1 is a block view of an example of application of a television system discrimination circuit in a well known television system converter.
Figure 2:
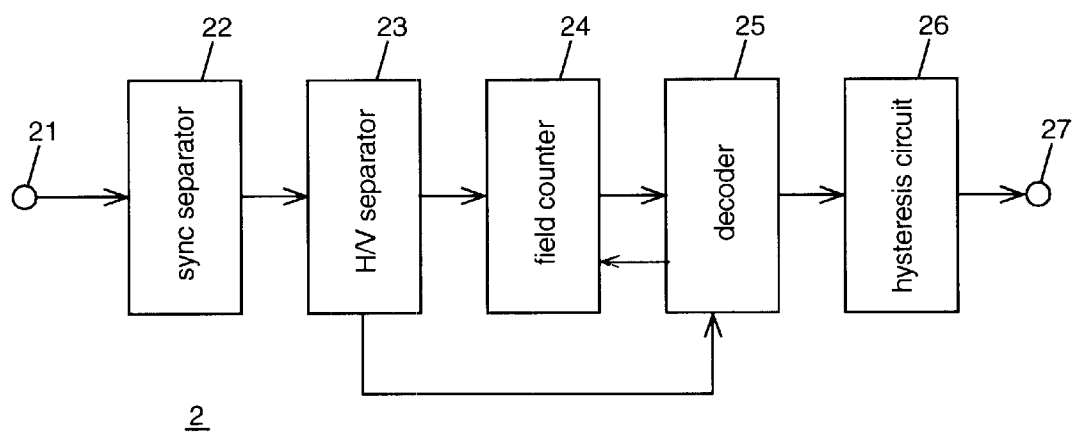
FIG. 2 is a block view showing a configuration of a related television system discrimination circuit.
Figure 3:
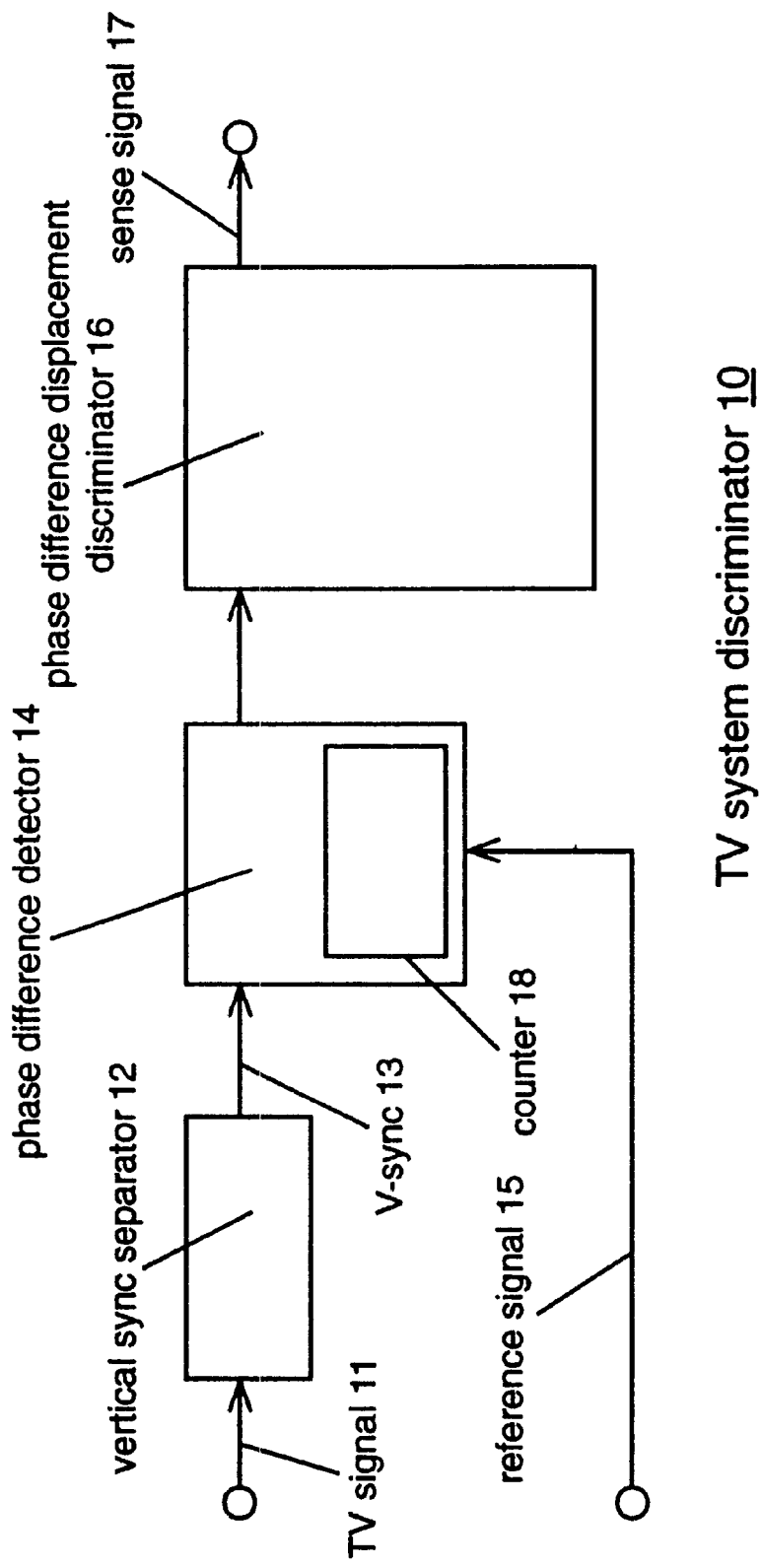
FIG. 3 is a block view showing a configuration of a TV system discriminator to which this invention is applied.

FIG. 3 is a block diagram showing a configuration of a TV system discriminator 10 of this embodiment.

This TV system discriminator 10 comprises a vertical sync separator 12, phase difference detector 14 and phase difference displacement discriminator 16.

The vertical sync separator 12 is for separating a V-sync 13 constituting a synchronized signal from a TV input signal 11 consisting of a composite TV signal, a luminance signal and a color signal or chroma signal. This separated V-sync is then inputted to the phase difference detector 14.

Figure 4:
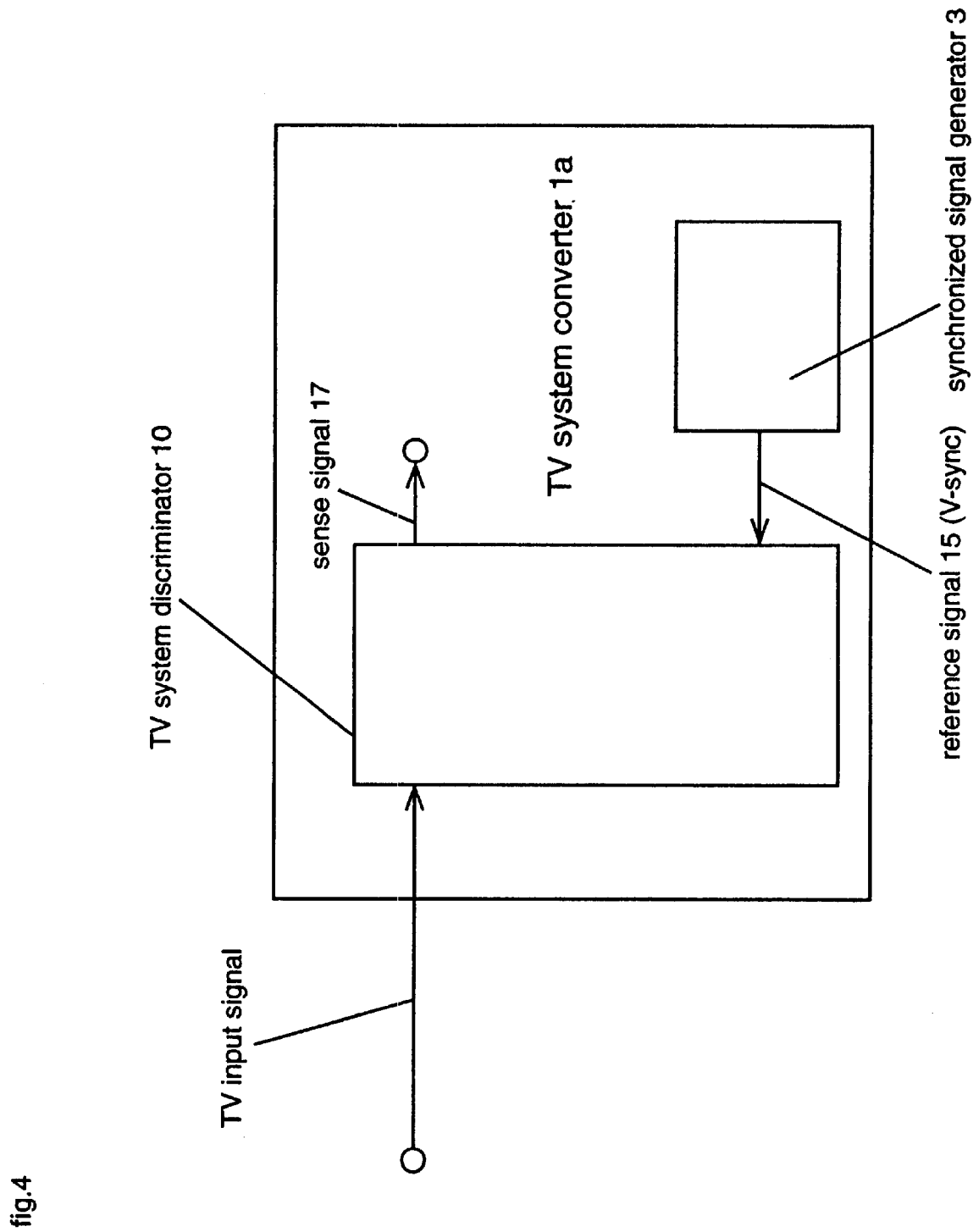
FIG. 4 is a block view showing a configuration for applying the TV system discriminator to a television system converter.

As shown in FIG. 4, an externally supplied reference signal V-sync 15 having the same field frequency as a vertical sync signal of a prescribed television system is externally supplied to the phase difference detector 14. The reason for this configuration is that the TV system converter employing the TV system discriminator 10 has to have a synchronized signal generator 3 for generating a synchronized signal corresponding to the TV system to be represented by the outputted signal. The synchronized signal generated by this synchronized signal generator 3 is therefore discerned as the reference signal.

Alternatively, a dedicated reference signal generator can be provided within the phase difference detector 14 in order to generate this reference signal V-sync 15.

This phase difference detector 14 detects the phase difference of the separated V-sync 13 and the reference signal V-sync 15. The phase difference detector 14 has a counter 18 for carrying out counting using a clock signal of a higher speed than the V-sync. This counter 18 starts counting at an input timing of the separated V-sync 13. The count is then halted and the count value is-outputted to the phase difference displacement discriminator 16 as sensed phase difference information. The counter 18 is then reset (the counter 18 starts counting when the separated V-sync 13 is input and halts counting when the reference signal 15 is input. The obtained count value is then supplied to the phase difference displacement discriminator 16 as phase difference information. The counter 18 is then reset and the above process is then repeated when V-sync 13 is inputted).

The phase difference displacement discriminator 16 analyzes the direction of temporal displacement of phase difference information to determine "whether or not there is an increase or decrease in phase difference with a lapse of time" based on phase difference information sequentially supplied from the phase difference detector 14.

When the sensed phase difference information hardly changes after time has passed, i.e. when fluctuations of the phase difference information within a fixed period are within a prescribed threshold value, the phase difference displacement discriminator 16 outputs a first sense signal 17 corresponding to this state.

Conversely, when the sensed phase difference information changes after time has passed, i.e. when fluctuations of the phase difference information within a fixed period exceed a prescribed threshold value and there is a shift in such a manner that the phase difference increases or decreases, the phase difference displacement discriminator 16 outputs a second sense signal 17 corresponding to this state.

The phase difference displacement discriminator 16 outputs a sense signal 17 showing whether or not a value for a phase difference shift shifts in one direction within a minute time $\beta$ after the passage of a prescribed time $\alpha$. Here, $\alpha > \beta$, and $\alpha$ and $\beta$ are shorter than the time for an identical repeating period for the timing for the V-sync of the plurality of television systems that are to be discrimination objects.

The phase difference displacement discriminator 16 then obtains a shift of a phase difference at a timing differing by just the time $\alpha$ and outputs a sense signal 17 indicating whether or not the value for this phase difference shift falls within the range of a prescribed threshold value, i.e. indicating whether or not this shift is approximately 0.

When the sense signal 17 indicates that the phase difference shift is approximately zero even after the passage of time, this means that the inputted separated V-sync 13 and the reference signal 15 have the same period. It can therefore be determined that the TV system for the TV input signal 11 is a television system having the same field fiequency as the reference signal 15.

On the other hand, when the sense signal 17 indicates that the phase difference shift moves in one direction with the passage of time, this means that the inputted separated V-sync 13 and the reference signal 15 have different periods. The television system of the TV input signal 11 is therefore different from the television system having the field frequency of the reference signal 15 and is therefore determined to be another television system.

This phenomena is now described in detail using the drawings. Now, the phase difference between the separated V-sync 13 and the reference signal 15 at a specific time is taken to be the relationship shown in FIG. 5(A).

Figure 5:
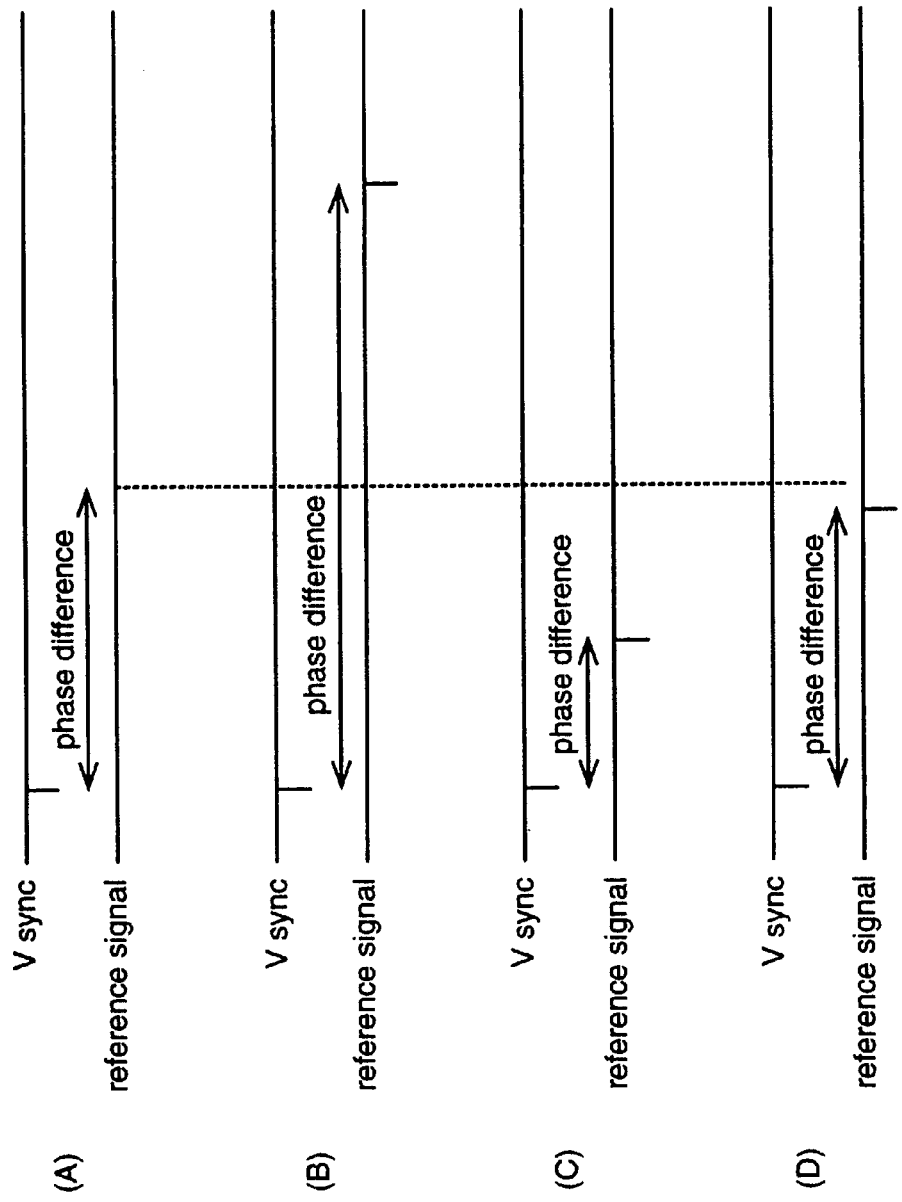
FIG. 5 is an illustration showing approximate classifications of tendencies of phase difference displacement sensed at the TV system discriminator.

The direction of shifting after a time ox has passed for this phase difference is classified into one of FIG. 5(B) to FIG. 5(C).

In FIG. 5(B), the phase difference after a time $\alpha$ has elapsed is large compared to FIG. 5(A). This is because the period of the reference signal is longer than the period of the separated V-sync 13. This direction of shifting means that the field frequency of the TV input signal 11 is higher than the field frequency of the TV system defined by the reference signal 15 and it can therefore be discerned that the TV system of the TV input signal 11 is different from the TV system defined by the reference signal 15.

In an example actually used in High Definition Television, if the reference signal 15 corresponds to 1125 lines/59.94 Hz High Definition Television, then when a 1125 lines/60 Hz TV input signal 11 is inputted, the phase difference shifts from the state in FIG. 5(A) to the state in FIG. 50(B).

In FIG. 5(C), the phase difference after a time ax has elapsed is small compared to FIG. 5(A). This is because the period of the reference signal is shorter than the period of the separated V-sync 13. This direction of shifting means that the field frequency of the TV input signal 11 is lower than the field frequency of the TV system decided by the reference signal 15 and it can therefore be discerned that the TV system of the TV input signal 11 is different to the TV system decided by the reference signal 15.

In an example actually used in High Definition Television, if the reference signal 15 corresponds to 1125 lines/60 Hz High Definition Television, then when a 1125 lines/59.94 Hz TV input signal 11 is inputted, the phase difference shifts from the state in FIG. 5(A) to the state in FIG. 5(C).

In FIG. 5(D), the phase difference after time at has passed is substantially the same compared with 5(A). This is because the period of the reference signal is equal to the period of the separated V-sync 13. This direction of shifting means that the field frequency of the TV input signal 11 is equal to the field frequency of the TV system defined by the reference signal 15 and it can therefore be discerned that the TV system of the TV input signal 11 is the same as the TV system defined by the reference signal 15. In an example of actual High Definition Television, if the reference signal 15 corresponds to 1125 lines/60 Hz High Definition Television, then when a 1125 lines/60 Hz TV input signal 11 is inputted, the phase difference shifts from that of FIG. 5(A) to that of FIG. 5(D). According to the aforementioned embodiment, the television system of a TV input signal is discriminated based on a temporal shifting of a phase difference between V-sync of a TV input signal and reference signals corresponding to one of a pluiality of TV systems of discrimination targets. The TV system of the TV input signal can therefore be accurately discriminated even when the field frequencies of a plurality of TV systems of discriminating objects are close.

For example, according to this embodiment, accurate discrimination can be achieved even for two types of TV system for High Definition Television having extremely close values of field frequency ratios of 1001:1000. This invention can also be applied to two types of TV systems with a relationship of 50 fields to 60 fields.

In the above embodiment it is not necessary to separate the H-sync from the TV input signal because horizontal scanning line information is not utilized in discriminating the system. The TV system discriminator can therefore be made small.

This invention can be made compatible with the TV input signal being an analog signal or a digital signal by making the configuration of the vertical sync separator 12, phase difference detector 14 and the phase difference displacement discriminator 16 compatible with analog or digital signals, i.e. the present invention can also be applied to TV input signals that are digital signals as well as TV input signals that are analog signals.

In this embodiment, the output from the phase difference displacement discriminator 16 is a sense signal 17 indicating whether or not the TV system relates to the reference signal 15 but it is also possible to output discrimination data for the TV system. For example, the phase difference displacement discriminator 16 can be notified in advance of the TV system relating to the reference signal 15 and discrimination data for the disc ed TV system can be outputted in response to the sense results.

In this embodiment the configuration is for discriminating two types of TV system of differing field frequencies but this invention can also be applied to discriminating three or more types of TV systems of differing field frequencies. For example, discrimination for three or more types of TV system can be carried out based on the amount of shifting per prescribed unit of time of the phase difference between the separated V-sync 13 and the reference signal 15.

In this embodiment, the TV system is discriminated based on the field frequency but the present invention can also be applied to discriminating the TV system based on the line frequency, i.e. the present invention can be applied to a configuration for discriminating a TV system based on temporal shifting of a phase difference between a separated H-sync constituting a synchronized signal and a reference signal.

A configuration is also possible where optimum discrimination results are obtained by integrating discrimination results based on a difference in field frequency and discrimination results based on differences in line frequency.

In this embodiment phase difference is detected for every field but phase differences of field frequencies can also be detected once every plurality of fields, for example, each one frame.

Further, in this embodiment, a reference signal corresponds to a synchronized signal of one a plurality of TV systems to be discriminated but it is not essential to make this correspond to a particular synchronized signal. For example, when carrying out discrimination relating to two types of TV system of a 60 fields per second and a 50 fields per second system, a configuration can be adopted for carrying out discrimination of a television system based on the presence of a shift in phase difference in an "increasing direction" or a "decreasing direction" that employs a reference signal corresponding to 55 fields per one second.

In this embodiment, a TV system discriminator is applied to a television system converter but the present invention can also be employed as a TV system discriminator in devices other than TV system converters.

As described above, according to the TV system discriminator of this invention, this invention can be applied whether the TV input signal is an analog signal or a digital signal and accurate discrimination can be- achieved even between TV systems where the difference between line numbers and field numbers is small.

What is claimed is:

1. A TV system discriminator, comprising:
    a separator for extracting a synchronized signal of a TV signal inputted in accordance with one of a plurality of TV systems;
    a phase difference sensor for sensing a phase difference of the separated synchronized signal and a prescribed reference signal; and
    a phase difference displacement discriminator for discriminating a TV system corresponding to the inputted TV signal based on a direction of temporal displacement of the phase difference,
    wherein the phase difference sensor counts phase differences between the separated synchronized signal and the reference signal for a prescribed period and sends a count value to the phase difference displacement discriminator, and
    wherein the phase difference displacement discriminator discriminates a TV system corresponding to the inputted TV signal based on fluctuations of the count value counted in the prescribed period.

2. The TV system discriminator of claim 1, wherein the reference signal has the same frequency as a frequency of a synchronized signal of one of the plurality of television systems.

3. The TV system discriminator of claim 1, wherein the phase difference displacement discriminator compares the magnitude of fluctuations in the count value with prescribed threshold values.

4. The TV system discriminator of claim 3, wherein: the reference signal has the same frequency as a frequency of a synchronized signal for one of the plurality of TV systems; and the phase difference displacement discriminator discriminates that the inputted TV signal is of a TV system having the same frequency signal as the frequency of the reference signal when the magnitude of the fluctuation in the count value is within the range of the prescribed threshold values.

5. The TV system discriminator of claim 1, wherein the separated synchronized signal is a vertical synchronized signal.

6. The TV system discriminator of claim 1, wherein the plurality of TV systems is two TV systems of differing synchronized signal frequencies.

7. The TV system discriminator of claim 1, wherein the TV signal is an analog signal.

8. A TV system discriminating method, comprising the steps of:

extracting a synchronized signal for a TV signal inputted in accordance with one of a plurality of TV systems;

sensing a phase difference of the separated synchronized signal and a prescribed reference signal; and discriminating a TV system corresponding to an inputted TV signal based on a direction of temporal displacement of the phase difference, wherein the phase difference of the separated synchronized signal and the reference signal is counted for a prescribed period so as to obtain a count value, and wherein a TV system corresponding to the inputted TV signal is discriminated based on fluctuations in the count value counted at the prescribed period.

* * * * *